W. R. FEE.
Cotton Seed Huller.
No. 107,349. Patented Sept. 13, 1870.
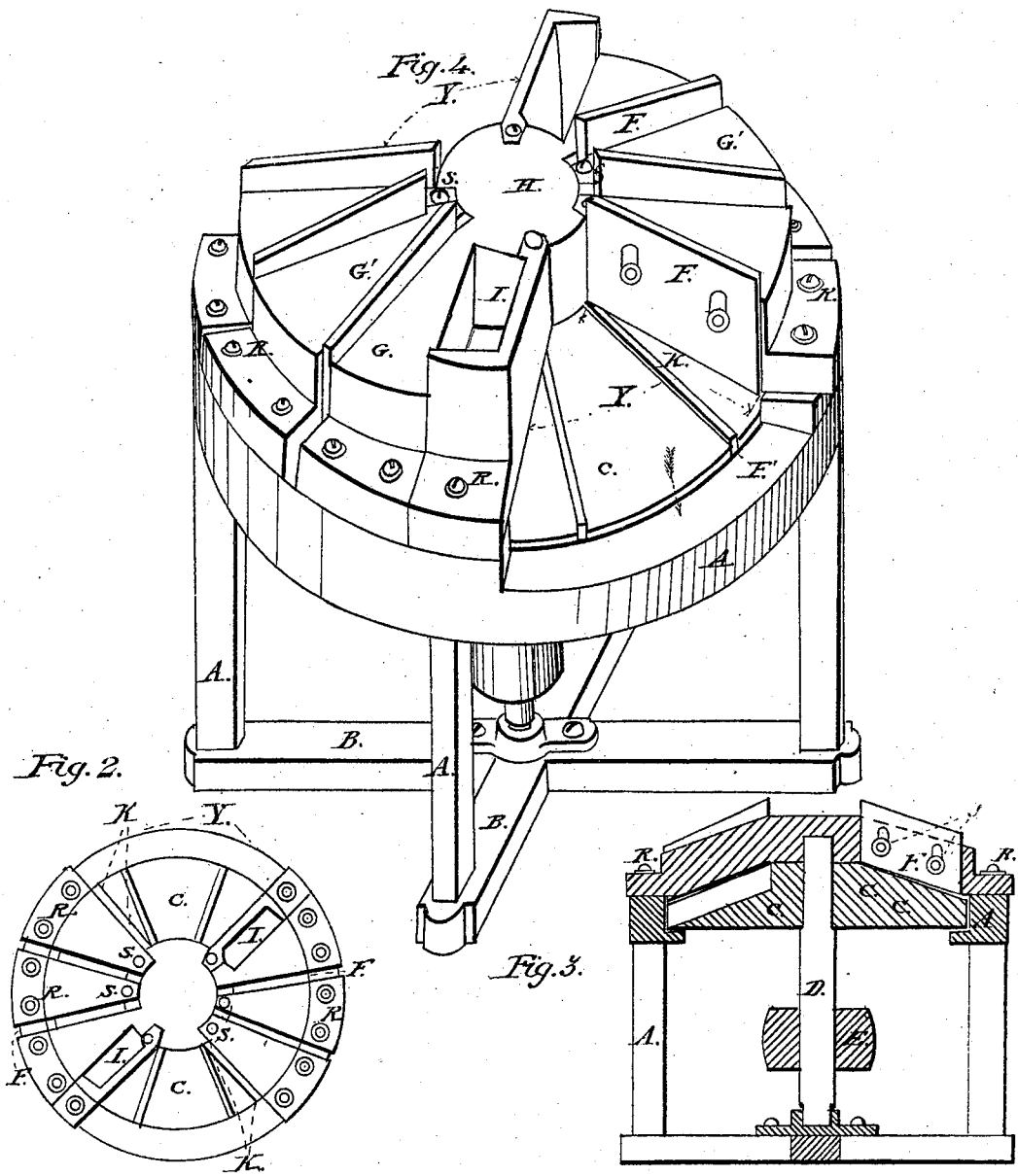
Witnesses:
Wm H Seaman
Henry N Myggatt
Inventor:
Wm R. Fee
by Daniel Breed
Atty

United States Patent Office.

WILLIAM R. FEE, OF CINCINNATI, OHIO.

Letters Patent No. 107,349, dated September 13, 1870.

IMPROVEMENT IN MACHINES FOR HULLING COTTON-SEED.

The Schedule referred to in these Letters Patent and making part of the same.

*To all whom it may concern:*

Be it known that I, WILLIAM R. FEE, of Cincinnati, Ohio, have invented a new and useful Improvement in Cotton-seed Hullers; and I do hereby declare that the following is a full and exact description thereof, reference being had to the accompanying drawing and the letters of reference marked thereon.

In the accompanying drawing—

Figure 1 is a perspective view of my improved centrifugal cotton-seed huller.

Figure 2 is a top view of the same.

Figure 3 is a vertical central section of the machine.

In the construction of my improved cotton-seed huller any suitable frame may be employed, as seen at A B, figs. 1 and 3.

Upon a shaft, D, is a revolving disk, C, with its upper and working surface inclined downward and outward, as seen in fig. 3. This shaft and disk are set in motion by any suitable power in connection with the band-pulley E.

The disk C is provided with knives, F', projecting beyond the face of the disk, as seen in the drawing.

Above the revolving disk is an opposing arch or concave, having a center piece, H, cast in the same piece with two of the sectors, G, thus forming a strong arch to support the removable sectors G', which are held in place by screws R and S.

The knives F' are fastened to the sectors by screws, *f*, and made adjustable by slots in the knives.

On each side of the machine is a delivery space, Y, made by omitting several sectors, thus allowing the seed to discharge along the whole length of the knives, as indicated at K, fig. 2.

By means of these large free spaces the cut seed is thrown completely over the lower edge of the revolving disk, thus preventing the possibility of clogging.

The revolving disk may be made with removable sectors and adjustable knives, similar to the arch above the disk.

The feed-hoppers I extend the whole length of the knives, which, by sweeping the whole under side of the hopper, cut the seed away at the bottom, and thus prevent clogging in the hopper.

Having thus fully described my invention, I claim—

1. The feed-openings I and the discharge-openings K, extending the whole length, or nearly the whole length of the knives, substantially in the manner and for the purposes set forth.

2. The revolving disk C, provided with the complete series of knives F', in combination with the opposing arch, with its delivery or discharge-spaces Y, and partial series of knives and sectors, substantially as set forth.

WM. R. FEE.

Witnesses:
 DANIEL BREED,
 WM. H. SEAMAN.